April 21, 1925. 1,534,879
M. G. STEWART
SWIVEL HOOK
Filed Feb. 2, 1924
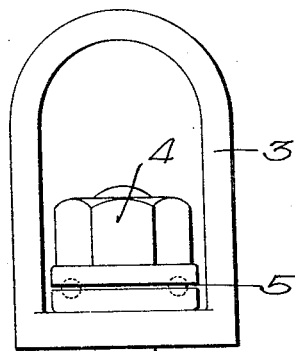
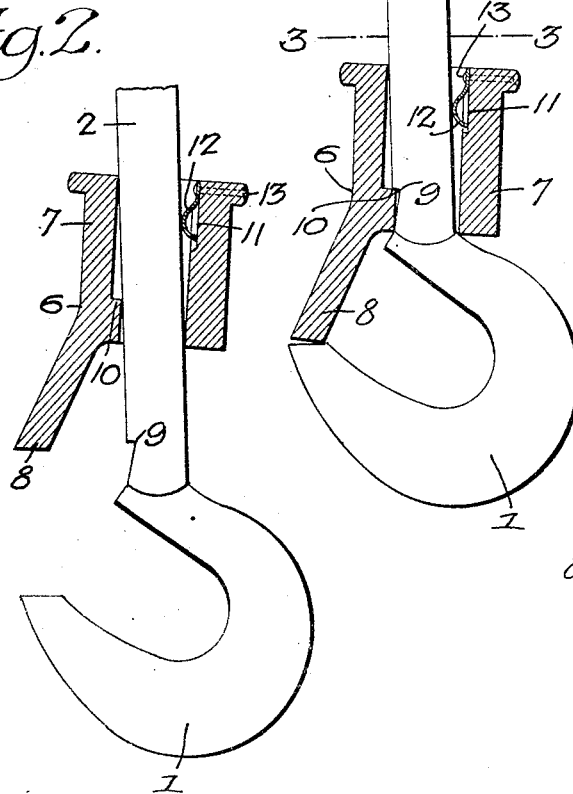
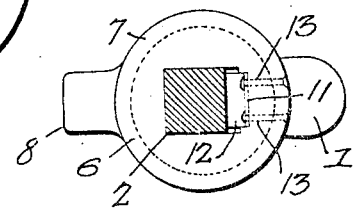
Inventor
Mark Gilmer Stewart.
by his Attorneys.

Patented Apr. 21, 1925.

1,534,879

UNITED STATES PATENT OFFICE.

MARK GILMER STEWART, OF SHREVEPORT, LOUISIANA, ASSIGNOR TO THE PELICAN WELL TOOL AND SUPPLY COMPANY, OF SHREVEPORT, LOUISIANA, A CORPORATION OF LOUISIANA.

SWIVEL HOOK.

Application filed February 2, 1924. Serial No. 690,176.

*To all whom it may concern:*

Be it known that I, MARK GILMER STEWART, a citizen of the United States, residing in Shreveport, Caddo Parish, Louisiana, have invented certain Improvements in Swivel Hooks, of which the following is a specification.

My invention relates to certain improvements in swivel hooks, especially those used in connection with hoisting mechanism.

One object of the invention is to provide a sliding guard which covers the point of the hook and serves not only to prevent the load from becoming detached but also to prevent the point of the hook from catching on anything as the hook is moved upward. In accordance with the invention the guard can be locked in the closed position, and it can be readily released by an operator when it is necessary to remove the load or to replace it in the hook.

A further object of the invention is to provide means for retaining the guard in the closed position, if, for any reason, the hook should become inverted.

In the accompanying drawings:

Fig. 1 is a side view of a swivel hoisting hook, showing the improved guard in section and in the closed position;

Fig. 2 is a side view of the lower portion of the hook, showing the slide raised; and Fig. 3 is a sectional view on the line 3—3, Fig. 1.

Referring to the drawings, 1 is a hook of the ordinary form having a square stem 2. 3 is a swivel eye. 4 is a nut on the end of the stem. Between the nut and the base of the swivel eye 3 is a ball bearing 5, of any suitable construction. From the drawing it will be noted that the point of the hook projects outward beyond the path of movement of the eye when the hook is moved longitudinally. Without suitable protection there would be a tendency for the point of the hook to catch on various objects and obstructions when the hook is moved as stated. In order to prevent this as well as to also hold the load on the hook, a suitable guard is provided which will be described in detail.

Arranged to slide on the square stem of the hook is a guard 6, having a body portion 7 and a finger 8. The finger 8 is so proportioned that it will rest upon and cover the end of the hook when in the closed position, as in Fig. 1. The square stem extends through a corresponding opening in the guard and prevents the guard turning on the hook. The finger of the guard is inclined, as shown, and registers with the point of the hook, preventing accidental engagement of the hook with obstructions past which the hook may be drawn.

The stem of the hook is notched at 9 directly above the hook, to form a downward exposed shoulder. This shoulder is adapted to be engaged by an upward exposed shoulder 10 on the guard, as in Fig. 1. The opening in the guard is somewhat larger than the stem so that the guard may have a slight rocking movement.

11 designates a recess in the upper end of the wall of the guard opposite the wall having the shoulder 10. A spring 12 is located in the recess and is secured by the rivets 13. The spring is preferably flat and is substantially the same width as the guard. This spring tends to tilt the hook, as shown in Fig. 1, holding the shoulder 10 in engagement with the notch 9 in the stem so that any pressure upon the finger of the guard by the load tends to bind the guard on the stem and any upward pressure on the finger will be counteracted by the shoulder engaging the notch in the stem. Therefore, the guard can be released only by the tilting of the upper end thereof toward the left, as viewed in Fig. 1. It will also be noted that any tendency of the finger 8 to move or be pushed inward is opposed not only by the positive contact of the guard against the stem at the notch, but also by the positive contact of the lower end of the finger against the hook.

The guard, when closed onto the hook, is at all times in position to protect the point of the hook and to retain the load within the hook against the possibiliy of its jumping off of the hook. The hook can be inverted when the guard is in the closed position, as it is held firmly in position by the shoulder and by the spring. The guard can be readily released by pressing against the spring side of the guard, which can then be raised by an upward movement. The spring holds the guard in the raised position, while the hook engages the load.

Although the stem of the hook is shown as square in cross section, it may be of any cross section, which prevents the guard turning on the hook.

I claim:

1. The combination of a hook member formed with a stem and with a laterally projecting point, and a rigid slidable guard surrounding and loosely fitting the stem and held against turning thereon, the said stem having a downward exposed shoulder near its lower end on the same side as the point of the hook, and the said guard having an integrally formed finger projecting downward and outward to contact with and cover the point of the hook and also having an inward projecting upward exposed shoulder between its ends adapted to fit under and engage the shoulder on the stem when the guard is in a tilted position and to be disengaged therefrom when the guard is not in a tilted position.

2. The combination of a hook member formed with a stem and with a laterally projecting point, a rigid slidable guard surrounding and loosely fitting the stem and held against turning thereon, the said stem having a downward exposed shoulder near its lower end and on the same side as the point of the hook, and the said guard having an integrally formed finger projecting downward and outward to contact with and cover the point of the hook and also having an inward projecting upward exposed shoulder between its ends adapted to fit under and engage the shoulder on the stem when the guard is in a tilted position and to be disengaged therefrom when the guard is not in a tilted position, and a spring tending to hold the guard in its said tilted position but allowing it to be moved therefrom and thereby released to permit sliding movement.

3. The combination of a hook member formed with a stem and with a laterally projecting point, a rigid slidable guard surrounding and loosely fitting the stem and held against turning thereon, the said stem having a downward exposed shoulder near its lower end and on the same side as the point of the hook, and the said guard having an integrally formed finger projecting downward and outward to contact with and cover the point of the hook and also having an inward projecting upward exposed shoulder between its ends adapted to fit under and engage the shoulder on the stem when the guard is in a tilted position and to be disengaged therefrom when the guard is not in a tilted position, and a spring tending to hold the guard in its said tilted position but allowing it to be moved therefrom and thereby released to permit sliding movement, the said spring being located between the upper end of the guard and the stem at the side opposite to the said shoulders.

MARK GILMER STEWART.